(12) United States Patent
Fry et al.

(10) Patent No.: US 11,161,110 B2
(45) Date of Patent: Nov. 2, 2021

(54) MEMS OPTICAL LIQUID LEVEL SENSOR

(71) Applicant: International Business Machines Corporation, Armonk, NY (US)

(72) Inventors: Jonathan Fry, Fishkill, NY (US); Daniel Piper, Vancouver, WA (US); Yongchun Xin, Poughkeepsie, NY (US); Jang Sim, Dutchess, NY (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 16/111,816

(22) Filed: Aug. 24, 2018

(65) Prior Publication Data

US 2020/0061611 A1 Feb. 27, 2020

(51) Int. Cl.
*B01L 3/00* (2006.01)
*G01N 21/41* (2006.01)

(52) U.S. Cl.
CPC .... *B01L 3/502715* (2013.01); *G01N 21/4133* (2013.01); *B01L 2300/02* (2013.01); *B01L 2300/0654* (2013.01); *B01L 2300/0663* (2013.01)

(58) Field of Classification Search
CPC .......... B01L 3/502715; B01L 2300/02; B01L 2300/0654; B01L 2300/0663; G01N 21/4133
See application file for complete search history.

(56) References Cited

U.S. PATENT DOCUMENTS

| 4,870,292 | A | 9/1989 | Alpert et al. |
| 4,880,971 | A | 11/1989 | Danisch |
| 4,994,682 | A | 2/1991 | Woodside |

(Continued)

OTHER PUBLICATIONS

Groen et al., "Design Considerations for a Micromachined Proportional Control Valve", Micromachines 2012, vol. 3, No. 2, Received: Feb. 6, 2012; in revised form: Apr. 6, 2012/Accepted: Apr. 24, 2012 / Published: Apr. 27, 2012, http://www.mdpi.com/2072-666X/3/2/396/htm, pp. 396-412.

(Continued)

*Primary Examiner* — Samuel P Siefke
(74) *Attorney, Agent, or Firm* — Scully, Scott, Murphy & Presser, P.C.; L. Jeffrey Kelly, Esq.

(57) ABSTRACT

Microfluidic chips incorporating liquid level sensors for precise sensing of liquid levels in microfluidic system structures, e.g., channels, cavities or reservoirs without moving parts. The microfluidic system uses liquid level photosensors and use optical properties to measure liquid volumes. A light coupling emitter or waveguide transmits the light toward the fluid channel at a critical angle. Multiple light coupling emitters and photosensor array can detect light for a variety of scenarios (based on fluid refraction index) and exploit the phenomenon of critical angles to measure exact angles of reflection/refraction. The waveguide coupler(s) and photosensors are manufactured at the microscale, and use both reflected light and refracted light as monitor signals. A feedback control system (e.g., compensating for rate and tolerance drift) is devised using signals generated by the sensors upon detecting reflected or refracted sensed light for increased accuracy of detecting precise amounts of fluid volumes being dispensed.

15 Claims, 9 Drawing Sheets

(56) References Cited

U.S. PATENT DOCUMENTS

| | | | |
|---|---|---|---|
| 5,422,495 A | 6/1995 | Cohn | |
| 6,173,609 B1 | 1/2001 | Modlin et al. | |
| 6,801,678 B2 | 10/2004 | Murshid | |
| 2008/0066542 A1* | 3/2008 | Gao | A61B 50/10 |
| | | | 73/290 R |
| 2009/0194714 A1 | 8/2009 | Nelson et al. | |
| 2011/0112472 A1* | 5/2011 | Jacobson | A61M 5/16804 |
| | | | 604/67 |

OTHER PUBLICATIONS

Omron, "MEMS Flow Sensors", https://www.omron.com/ecb/products/sensor/special/mems/flowsensor/downloaded from the Internet Jun. 1, 2017, 3 pages.

Yang et al., "Fiber optical liquid level sensor under cryogenic environment" Proceedings of SPIE, vol. 4204, Fiber Optic Sensor Technology II, Mar. 1, 2001; pp. 206-215.

* cited by examiner

MEMS OPTICAL LIQUID LEVEL SENSOR

FIELD

The present invention relates generally to microfluidic systems and devices and particularly to a micro-electromechanical system (MEMS)-based microfluidics system employing optical sensors for sensing liquid levels at a microscale in a chip to provide for accurate liquid volume measurements.

BACKGROUND

Oftentimes, there is an acute need to dispense exact amounts of chemicals at a microscale, e.g., for medical or drug dispensing applications. Currently, there is no liquid or fluid volumetric measurement system at microscale that is robust to motion/movement. In microfluidics systems, MEMS pumps suffer from manufacturing variation, and control is difficult (e.g., there are no adjustable voltage rails/clocks as in transistor systems). There is no clear method of adjustment or compensation.

Further, MEMS pumps performance characteristics can change over time as moving parts degrade, build-up biofilms or reactive agents, etc.

Further, many MEMS pump designs are not self-cleaning.

Further, most current bench-top microfluidics experimental systems use direct observation for control (e.g. they are mounted on glass plates and observed under magnification); as such there are not many in-situ controls/sensors for comparison.

While there exist commercially available gas system MEMS flow rate sensors, these are too large for microfluidics systems, and these sensors utilize different measures in temperature to estimate flow and cannot be used for precise dosing.

SUMMARY

A general-purpose, reusable microfluidic MEMS system for a microfluidic chip functioning as a fluid level dispenser (e.g. an implantable multi-drug dispenser) including novel MEMS liquid level sensors operationally incorporated into a microfluidics system, with no moving parts, for more precise volumetric fluid dispensing and measurement applications.

A general-purpose, reusable microfluidic MEMS system functioning as a fluid level dispenser wherein the MEMS liquid level sensors can be used for MEMS pump feedback control and exact dispensing system (e.g., as pump characteristics change over time).

In an additional configuration using ganged or an array of multiple optical liquid level sensors, there is further enabled improved quantization/control of larger fluid doses.

In further embodiments, feedback from the ganged or arrays of MEMS liquid level sensors may be further or additionally used for data collection/assay applications.

A general-purpose, reusable microfluidic MEMS system functioning as a fluid level dispenser (e.g. an implantable multi-drug dispenser) including components that can run multiple reactions that will not interfere with each other due to residual traces left behind, i.e., the microfluidics system is easily cleaned with a solution flushed through.

In one aspect, there is provided a microfluidics system. The microfluidics system comprises: an integrated circuit (IC) chip having a cavity structure adapted to receive fluid from a fluid source and convey the fluid to another location on the chip; a waveguide element for coupling an input light from a light source to a boundary of the cavity; a first sensor integrated within the IC at a first location relative to the cavity for detecting light at a first location; a second sensor integrated within the IC at a second location relative to the cavity for detecting light at a second location, the first and second sensors generating a respective electrical signal upon a respective detection of light; and a controller in the circuit chip signals receiving the respective electrical signal upon detection of the light at a first sensor, the second sensor or the first and second sensor, the controller generating signals for controlling the fluid source to dispense a precise amount of fluid based on received first and second electrical signals.

In a further aspect, there is provided a method of operating a microfluidics system in an integrated circuit (IC) chip having a cavity structure adapted to receive fluid from a fluid source and convey the fluid to another location on the chip. The method comprises: coupling, using a waveguide element, an input light from a light source to a boundary of the cavity for injecting light into the cavity; detecting, using a first sensor integrated within the IC, a light at a first location relative to the cavity; detecting, using a second sensor integrated within the IC, light at a second location relative to the cavity, the first and second sensors generating a respective electrical signal upon a respective detection of light; receiving, at a controller in the circuit chip, the respective first and second electrical signals upon detection of the light at a first sensor, the second sensor, or both the first and second sensors, and generating, at the controller, signals for controlling the fluid source to dispense a precise amount of fluid based on received first and second electrical signals.

In yet a further aspect, there is provided a microfluidic chip comprising: a substrate having a microfluidic cavity for receiving and dispensing a fluid; one or more waveguide elements integrated within the substrate, each waveguide element for coupling a respective input light from a light source to a boundary of the cavity; an array of first sensors integrated within the substrate at first locations relative to the cavity and each first sensor for detecting light at the respective first locations; an array of second sensors integrated within the substrate at respective second locations relative to the cavity for detecting light at the respective second locations, each first sensor of the array of first sensors and each second sensor of the array of second sensors generating a respective electrical signal upon a respective detection of light; a controller in the chip receiving the respective electrical signal upon detection of the light at one or more first sensors of the array, detection of the light at one or more the second sensors of the array, or detection of the light at both one or more of the first sensors and one or more of the second sensors, the controller responsively generating signals for controlling the fluid source to dispense a precise amount of fluid based on the received electrical signals.

Systems and applications embodying the present invention will now be described, by way of non-limiting examples, and in reference to the accompanying drawings. Technical features depicted in the drawings are not to scale.

DETAILED DESCRIPTION

Microfluidics generally refers to wafer-based, microfabricated devices, which include microchannels and microstructures that are used for pumping, sampling, mixing, analyzing and dosing liquids.

Figure 1:
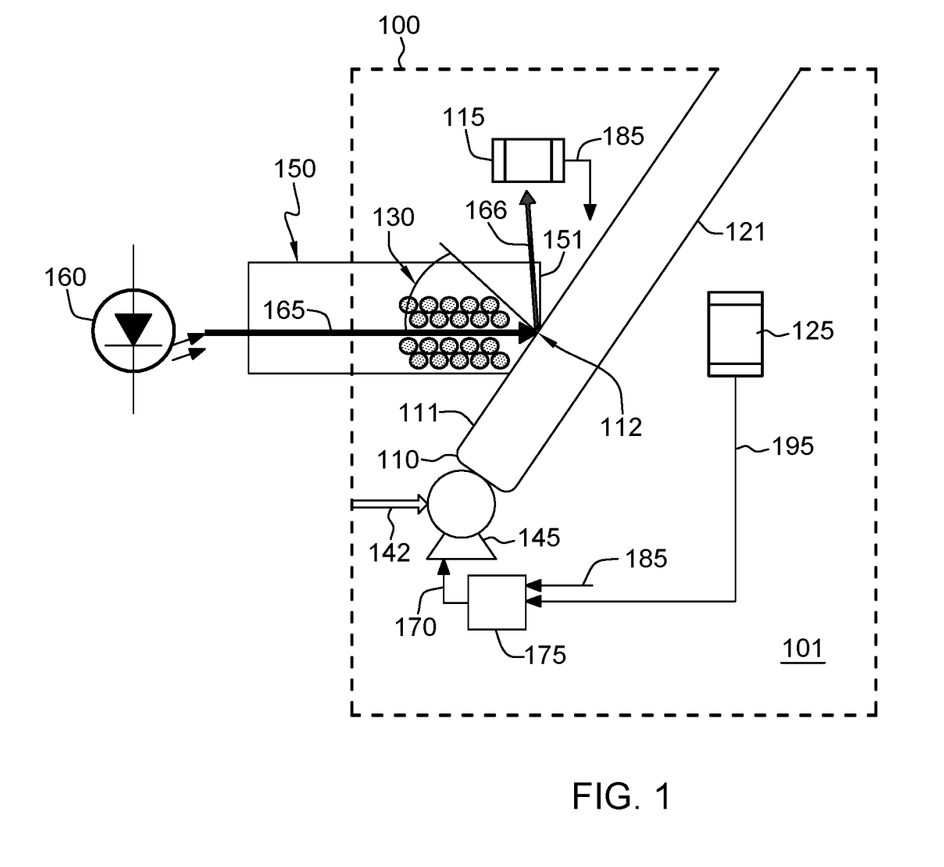
FIG. 1 is a diagram depicting an embodiment of a fluid dispensing portion of a microfluidic system formed in a semiconductor microchip according to one embodiment.

FIG. 1 is a schematic diagram depicting an embodiment of a fluid dispensing portion of a microfluidic system 100 formed in a semiconductor microchip or biochip according to one embodiment. The microfluidic system 100 includes a channel or cavity 110 formed on or in a semiconductor substrate 101 (e.g., a Si wafer) operatively connected to other elements of a microfluidics system such as a microfluidic pump 145, fluid reservoir(s) (not shown), valves, check valves, fluid multiplexing switches, liquid loading pads, capillary pumps, conduits and channels, etc., all formed using standard Si semiconductor processing techniques). In one non-limiting embodiment, and for purposes of description, microfluidics system 100 includes a liquid or fluid dispensing system including cavity 110 of a known volume for receiving a liquid or fluid pumped by a microfluidic pump system 145 for pumping and dispensing controlled amounts of liquid through the cavity for output and/or use by other components of the micro-chip or biochip. In one embodiment, microfluidics system 100 includes micro-electromechanical system (MEMS)-scale components. In one embodiment, the cavity 110 is shown in the form of a straight-tube, however, it may be a reservoir, a channel, or other fluid receptacle or conveyance structure. A MEMS liquid channel may be on order of 1-1000 µm wide, e.g., tens of microns to hundreds of microns.

As shown in FIG. 1, microfluidics system 100 incorporates one (or a plurality) of MEMS-based liquid level sensors 115, 125 integrated at various locations along and adjacent cavity 110 that provide detection and optical sensing of a fluid (or any liquid or gas that produces an optical refraction difference). In one embodiment, microfluidics system 100 includes a light coupling waveguide 150 built into the semiconductor chip for injecting light 165 coupled from an emitting light source 160 into cavity 110 for use in measuring liquid levels within the cavity. The light coupling waveguide 150 may be a solid fiber optic structure, e.g., of an oxide or glass, having an end for coupling light into the cavity. The waveguide can be a normal 1D waveguide or a photonic crystal waveguide. The waveguide 150 is typically high quality oxide for transmission properties and receives and injects from light source 160 a light or light pulses that may range anywhere from ultraviolet (UV) frequencies to Infrared (IR) range frequencies. A type of light to be injected by emitting light source 160 can be dependent upon the application and materials used to build the cavity within the substrate, e.g., taking into account absorption/transparency of the light by any films used to construct the cavity such as oxides, nitrides, and organics such as PMMA (Polymethylmethacrylate), Polyimides, polycarbonates, etc. Hydrophobicity at an interface 112 between the cavity sidewall 111 and the waveguide coupler 150 can be achieved by a PDMS (Polydimethylsiloxane) film. In one embodiment, transparency of the bulk film at the interface 112 of the waveguide end 151 and cavity sidewall films is required.

The one or more sensor devices 115, 125 which in embodiments include a photodiode or phototransistor (i.e., a photosensor) device is directly integrated in wafer substrate 101 at one or more locations and orientations in proximity to the cavity 110. In one embodiment, at least one integrated sensor 115 is configured to detect light intensity completely reflected from the cavity boundary 111 at interface 112. In particular, one sensor 115 is oriented at a location and distance relative to the cavity sidewall boundary 111 such that sensor 115 operatively detects light 166 internally reflected from the interface 112 between the light coupling waveguide end 151 and cavity boundary 111. In one embodiment, sensor 115 senses light 166 at a location where angle 130 between an axis corresponding to the injected light and cavity boundary is at a critical angle, and the sensed reflected light signal 166 corresponds to a complete internal reflection of light at the boundary 111 of the cavity and is the strongest signal it will receive.

The one or more additional sensors 125 are located adjacent another sidewall surface boundary 121 on the opposite side of the cavity 110 and oriented relative to the cavity to detect injected light intensity passing through (i.e., refracted within) the cavity and exiting the opposite side of the cavity. The sensor 125 (or sensors of a liquid level sensor array) on the receiver side will detect the change of angle at the microscale according to Snell's law which states that ratio of the sines of the angles of incidence and refraction is equivalent to the ratio of phase velocities in the two media (substrate and liquid) or equivalent to the reciprocal of the ratio of the indices of refraction of the two bounding media.

In embodiments herein, light intensity received at the respective photosensors 115, 125 is converted into respective electrical currents 185, 195 that are fedback from photosensors 115, 125 via conductive wiring to an on-chip microcomputer or microcontroller 175.

In one embodiment, the current fed back from the photosensors may be used to generate a control signal 170 for controlling, e.g., activating or de-activating, components of the microfluidics system. For example, current feedback from photosensors 115, 125 may be used to activate or deactivate the pump system 145 performing the fluid dispensing. In this manner, the microfluidics MEMS liquid pumping system 145 may receive a fluid from a reservoir structure at 142, e.g., stored in a structure of a semiconductor chip, and is controlled to dispense precise amounts of the fluid through the cavity 110 to another receptacle, e.g., a channel, reservoir, or for dispensing external to the chip. In one embodiment, the precise amount of fluid may be conveyed through channel 110 to a microfluidic mixing system channel or structure for mixing the measured dispensed fluid with another fluid or chemical for a mixing application.

Alternatively, or in a further configuration, the current fedback from photosensors is used to collect data (e.g., concentration, pH level) such as for a lab on a chip application—assay analysis, etc. and not necessarily used for liquid dispensing feedback control.

In one embodiment, the cavity 110 is initially empty, e.g., filled with air, or may be filled with a buffer or neutral fluid, e.g., saline. A baseline assumption or initialization is such that the dissimilar materials of the waveguide end material interface and the cavity contents provide either an initial total internal reflection of the injected light such only a default current 185 is sensed as an initial condition. Otherwise, the cavity contents may be such that a default level is less than a critical angle. In this instance, both an internal reflection and refraction based on an index of refraction of the content in the cavity such that currents 185, 195 may be detected in an initial state by both sensors 115, 125, i.e., a known state of currents 185, 195. The position and orientation of the sensors 115, 125 is such to anticipate the types of liquids/fluids anticipated to be measured and dispensed which determine the range and amount of reflected and refracted light and the resulting amount of currents that would be generated by sensors 115, 125.

Figure 2:
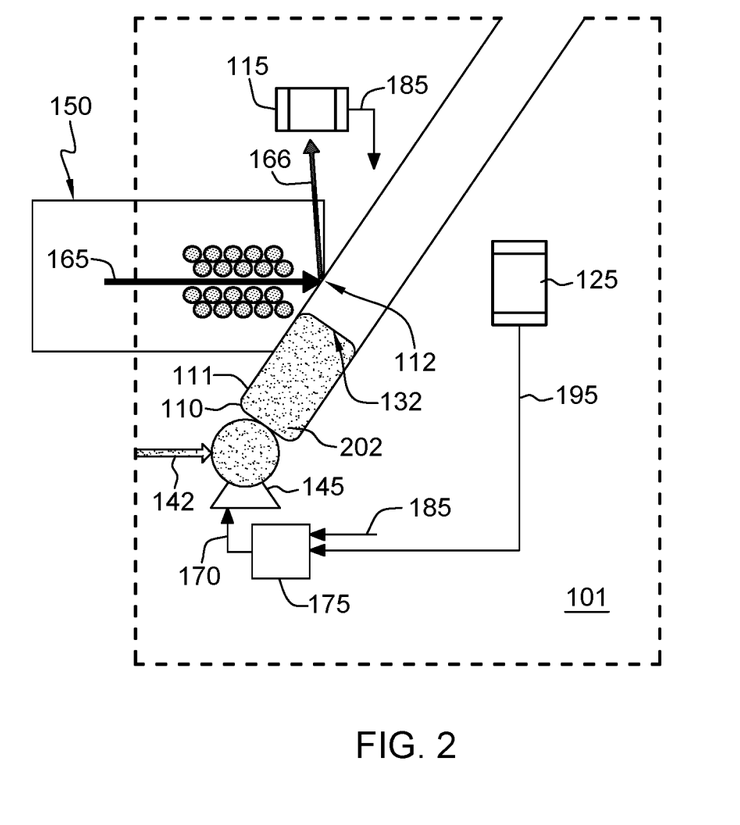
FIG. 2 depicts an embodiment of the microfluidics system of FIG. 1 shown as dispensing a fluid an amount of which is to be sensed by integrated liquid level sensors.

FIG. 2 depicts an embodiment of the microfluidics system of FIG. 1 shown as dispensing a fluid an amount of which is to be sensed by integrated liquid level sensors. FIG. 2 depicts the microfluidic pump system 145 to be operated to inject a liquid or fluid 202 into the cavity 110 and particularly shows dispensing at a point in time when liquid level in the cavity 110 is at a level 132 which is lower than the level at the boundary interface 112 at which input light is coupled from the waveguide. Thus, the angle 130 between waveguide and the cavity is at the critical angle and total internal reflection of light 165 results at the waveguide/cavity interface 112. Only detector 115 can detect light and no light is refracted through cavity 110 for detection. Thus, detector 115 generates a detectable electrical current 185 corresponding to the internal reflected light 166 received at sensor 115 while no current 195 is generated from the light sensor 125 as it receives no light refracted from the light source.

In one embodiment, there can be an initial condition of a particular type of fluid medium within the cavity, in which case a default known current 185 and 195 may be detected as an initial state. The photosensors (e.g., photodiodes or phototransistors) 115, 125 can both detect light when the liquid is present in the cavity, otherwise a "base" diode sensor 115 will receive only a reflection as shown in FIG. 2. An array of diodes along the height axis of the sensor can sequentially turn on as the height of the liquid increased. Granularity of the sensor could be achieved by fabrication in VLSI scale on order of deep sub-micron scale. Given MEMS liquid channels of 1-1000 μm wide, a resolution of the photodiodes using VLSI fabrication is on order of <100 nm. Additionally, the smaller the wavelength of light (e.g., UV wavelength ~400 nm or λ/2~200 nm) used for constructive shifting provide greater resolution. In one embodiment, a form factor can be increased to improve the resolution between the received photo diodes.

Figure 3:
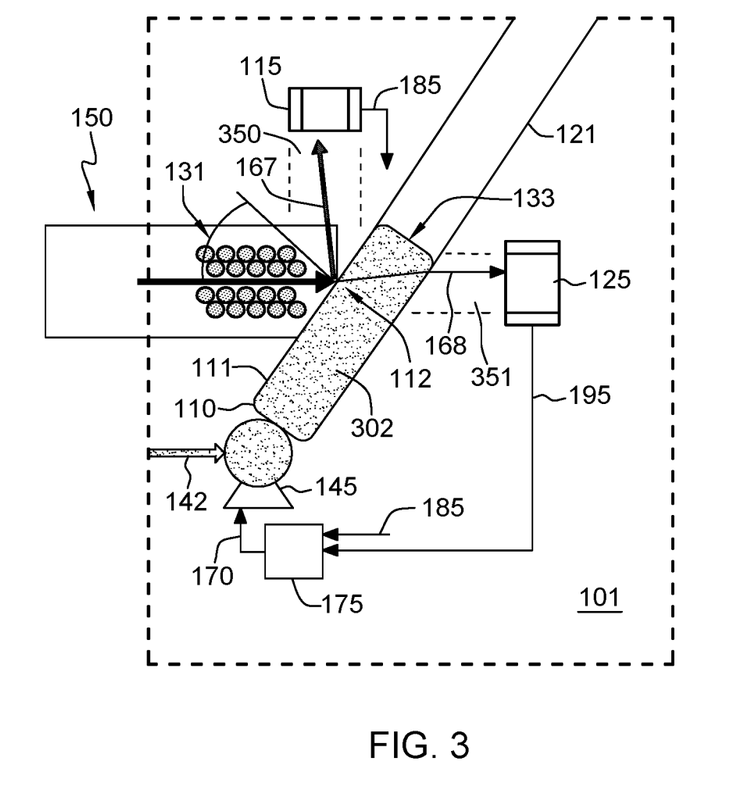
FIG. 3 depicts a further embodiment of the microfluidics system of FIG. 1 including integrated liquid level sensors 115, 125.

FIG. 3 depicts a further embodiment of the microfluidics system of FIG. 1 including integrated liquid level sensors 115, 125. FIG. 3 depicts the microfluidics pump system 145 to be operated to inject a liquid or fluid 302 into the cavity 110 and particularly at a point in time when liquid dispensed in cavity 110 is at a level 133 which is at the level of light from the light coupling from the waveguide input at the boundary interface 112 or elevated above the level of light injected at boundary 112. When the liquid 302 pumped into cavity 110 is at or elevated above the interface level 112 of the injected light input, the critical angle decreases, i.e., the angle between waveguide and the cavity is smaller than the critical angle 130, and there is less than total internal reflection of light at the cavity boundary 111. That is, angle 130 is equal to the critical angle when the cavity is at initial condition (e.g., empty or with a base liquid). When liquid with higher refractive index pass through the cavity, the critical angle of the device increases and the inject angle 131 is smaller than the critical angle under new condition, hence the refractive light is not zero when liquid passes through. At this state, sensor 115 will detect a portion 167 of input light reflected at the boundary 112. Due to the fluid level within the cavity at (or elevated above) the input light level, the critical angle is decreased such that detector 125 will also receive and detect light 168 refracted through the liquid 302 within the cavity and exiting the other side 121 of the cavity. In this scenario, detector 115 generates a detectable electrical current 185 corresponding to the portion 167 of input light 165 internally reflected at sensor 115 while a current 195 is also generated in response to the light sensor 125 receiving refracted through the liquid medium in the cavity. In one embodiment, once signal 195 is detected, it is known that the liquid 302 within the cavity has reached at the level of the interface 112 to cause a refraction, and that fluid level within the cavity is a known (measured) volume of fluid, e.g., in nanoliters. It is understood that any microfluidic pumping unit would scale with the size of the channel and detector spacing in the given embodiment. Placement of the sensors 115, 125 relative to the cavity (sidewall) boundaries and relative to the input light source ensures increased accuracy of detecting precise amounts of fluid being dispensed.

In one embodiment, as shown in FIG. 3, depending on design specifics, a further semiconductor waveguide 350 may be manufactured in device area or substrate 101 for orientation between the cavity 110 and light sensor 115 in order for reflected light ray 167 to be conveyed to the sensor 115 for sensing thereof. Similarly, a further semiconductor waveguide 351 may be manufactured in device area or substrate 101 on the other side of the cavity 110 and oriented between the cavity 110 and light sensor 125 in order for refracted light ray 168 to be conveyed to the photodetector 125.

In the embodiments of FIGS. 2 and 3, electrical currents 185, 195 generated when sensing reflected/refracted light are routed in the chip over conductors (not shown) from respective photosensors 115, 125 to a control circuit where a controller 175 is configured to control an activating or de-activating of the micro-pump system or a fluid switch by responsively generating control signal 170. In this manner, the microfluidics liquid pumping system may dispense precise amounts of fluids from the cavity 110 or measure any amount of fluid in any other structure such as a microfluidic reservoir structure in the semiconductor chip. For example, received signals from sensors 115, 125 can be used for MEMS pump feedback control and an exact dispensing system to counter effects of pump aging, as pump characteristics change over time.

Figure 4A:
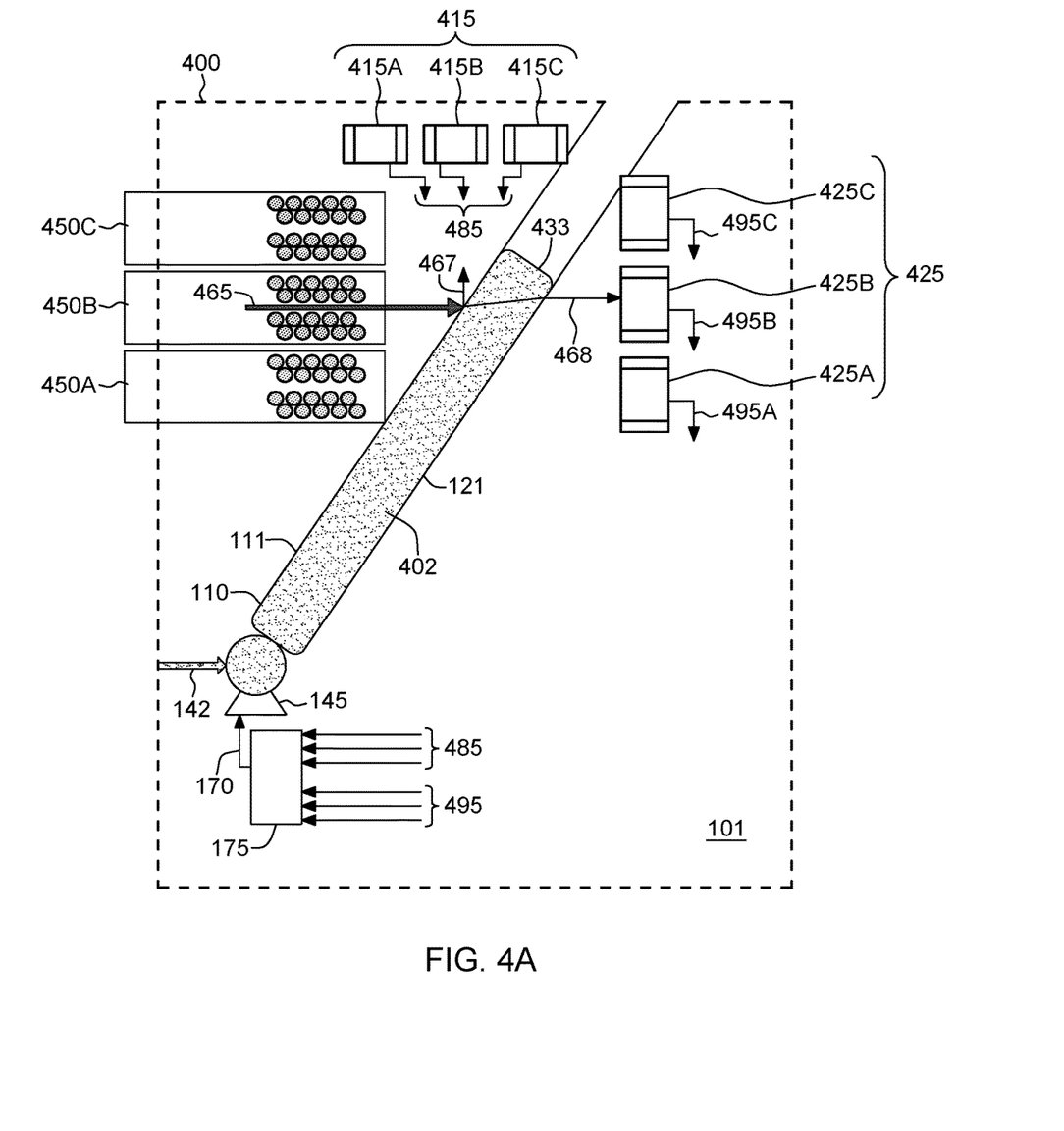
FIGS. 4A-4D show further embodiments of a microfluidics system in an IC chip including an array of light waveguide couplers along the length of the cavity and arrays of integrated liquid level sensors.
Figure 4B:
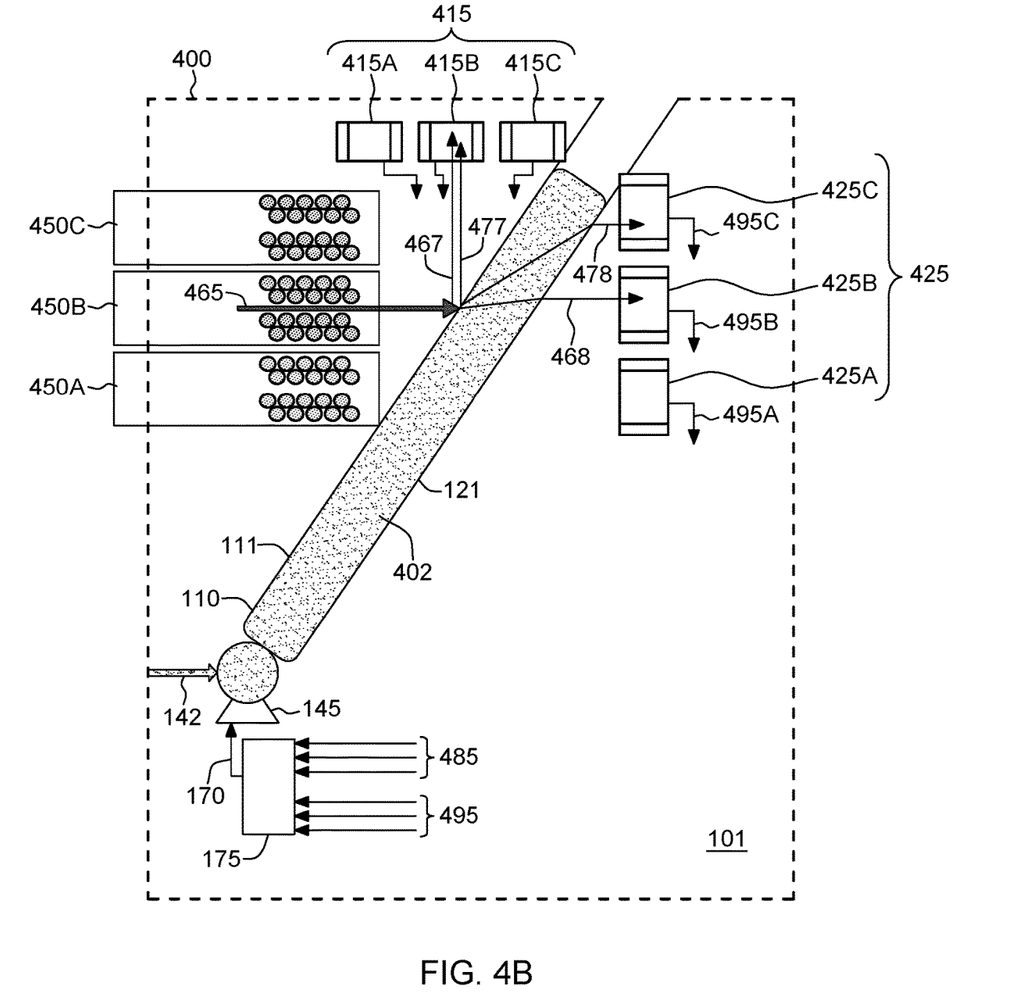
Figure 4C:
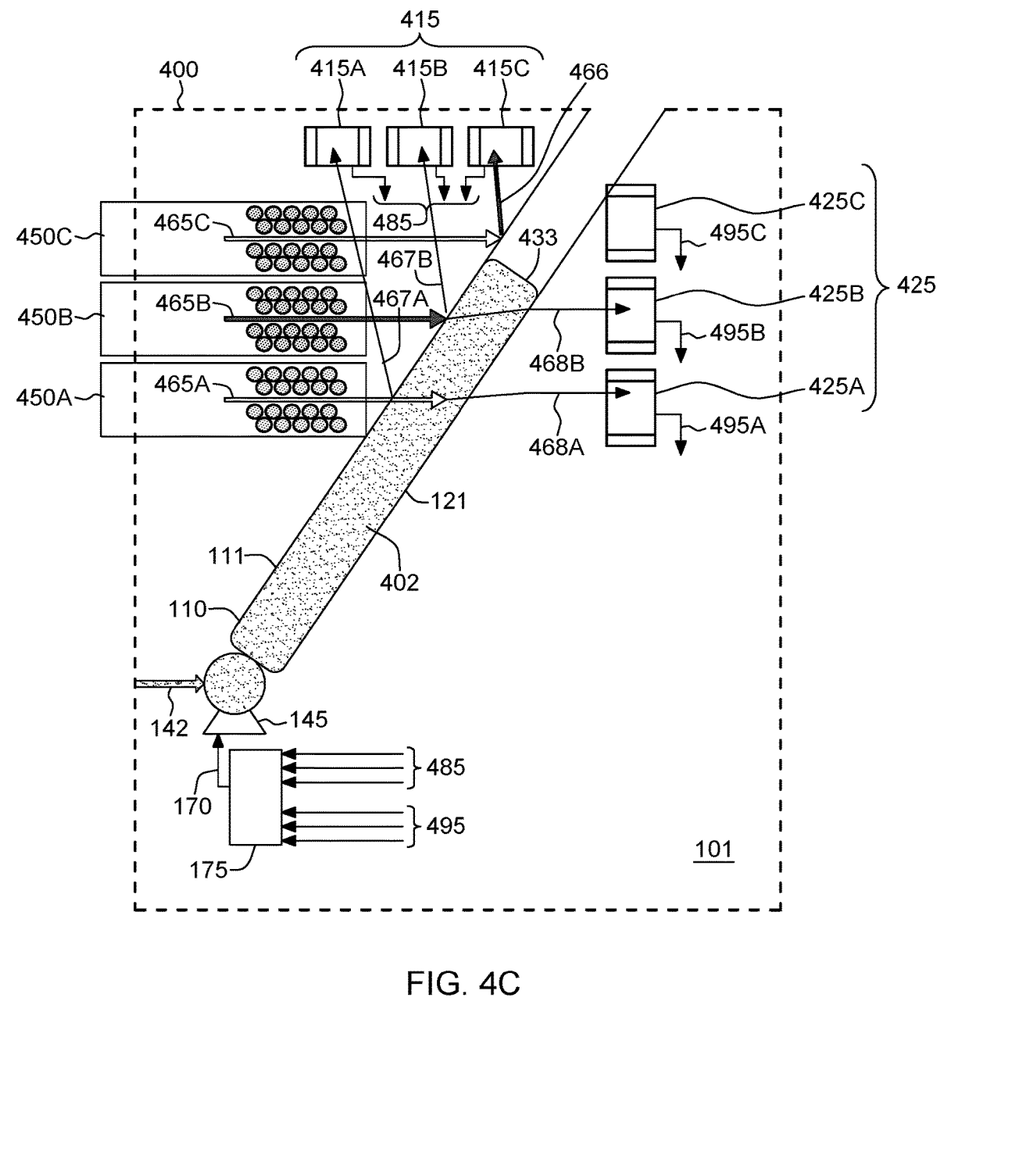

FIGS. 4A-4C show further embodiments of a microfluidics system in an IC chip including an array of light waveguide couplers along the length of the cavity and arrays of integrated liquid level sensors. In FIG. 4A, an array of light waveguide couplers 450A, 450B, 450C are provided, each configured to input a light 465 at a same or different light frequency, at sidewall boundaries along the length of the cavity 110. In this embodiment, an array of multiple photosensors 415 are "ganged" together on the light coupled waveguide side 111 of cavity 110 and oriented for receiving light reflected internally from the input light injected at a surface boundary of the cavity. Multiple sensors 425 are ganged together along a length of an opposite side 121 of the cavity in an alignment for receiving light refracted within the cavity from the input light of respective waveguides 450A, 450B, 450C when fluid 402 is present within the cavity. For example, although not drawn to scale, proximate a side or boundary 111 of cavity 110 there is provided a corresponding array of first MEMS light sensors (e.g., photosensors) 415A, 415B, 415C. Further, an array of second photosensors 425A, 425B, 425C are provided on an opposite side of the cavity. Each respective photosensor 415A, 415B, 415C of the multiple sensors 415 each generate a respective electrical current upon detection of input light reflected from the boundary of the cavity 110 while each respective photosensor 425A, 425B, 425C of the multiple sensors 425 each generate a respective electrical current 495A, 495B, 495C upon detection of input light refracted within the cavity and through the boundary of the cavity 110. Based on the knowledge of the types of fluid to be dispensed and flown within cavity 110, and the index of refraction of the fluid type, the spacing or distance between each of photosensors 415A, 415B, 415C and between each of photosensors 425A, 425B, 425C is determined to optimally detect the light. The use of multiple sensors ganged together enable the quantization/control of larger doses of dispensed fluid in cavity 110. For example, as shown in FIG. 4A, when liquid level sensor 495B receives a refracted light 468, a signal 495B is generated to indicate a corresponding known volume of liquid within the cavity. Similarly, when either sensor 495A, 495C detects a refracted light, corresponding signals 495A, 495C indicate a specified volume of fluid within cavity 110.

In one embodiment, system 400 may be configured highly sensitive and can measure micrometer liquid level changing by optimizing the waveguide and detector photosensor design.

A more dense configuration of sensors 415, 425 may enable clean quantization detection of the fluid flow within the cavity. A more sparse spacing may be used when different anticipated fluids with different indexes of refraction are being dispensed. For example, a first sensor 425A may be located for detecting refracted light through a first type of liquid being pumped in the cavity with a first index of refraction, and a second sensor 425C may be located a few millimeters distance from the first sensor for detecting refracted light through a second type of liquid with a second index of refraction being pumped in the cavity.

In further embodiments, feedback from the ganged or arrays of MEMS liquid level sensors may be further or additionally used for data collection/assay analysis applications. Examples of a type of assay analysis that may be conducted include: using the refractive index, e.g., embodied as light feedback from photosensors 415, 425, as a measure of fluid density or to correlate to mixture concentration or reaction completion or partial completion. Multiple measurements of refractive index can point toward mixture homogeneity or stratification.

For example, as shown in FIG. 4B, resulting from injected light 465 include different detections based on fluid composition, e.g., shown as internally reflected rays 467 and 477 and corresponding refracted output rays 468, 478. In this embodiment, the photosensor 415B may receive the reflected rays 467 and 477, however not both at the same time. For example, at a first time, ganged photosensor 495B may detect refracted light 468 from input light 465 and at a subsequent second time, ganged photosensor 495C may detect light 478 refracted through the cavity from input light 465 as the mixture concentration of liquid or mixture reaction within the cavity changes between the first and second times.

For example, fluids 402 may refract at different angles as a function of concentration of a composition, e.g., sugar, within a fluid solution, and input light may be bent due to the refractive angles that change within the fluid tube or cavity dependent upon the concentration. The design and location of the sensors, i.e., the spacing and grating of sensors 415, 425, are optimized based on anticipated types of fluids that is being dispensed through cavity and can be used to measure a completion of a reaction, a fluid density or concentration. For example, if the refractive angle of a fluid changes incrementally, a sensor may be located at a further distance (i.e., backed away) from the cavity boundary in order to capture the more minute differences in the angle, e.g., a shift of 2° degrees (e.g., as opposed to a 15° degree angular shift) thereby increasing light detection sensitivity.

FIG. 4C depicts an embodiment of FIG. 4A showing multiple input light rays 465A, 465B, 465C injected into cavity 110 and the resulting reflected and refracted rays. As shown, the liquid level within the cavity is at such level 433 that the injected light 465A, 465B is below the critical angle and a corresponding portion of these input signals 465A, 465B are reflected internally as signals 467A, 467B for sensing. These input signals 465A, 465B thus refract through the liquid level in the cavity, and are detected at the other side of the cavity as respective refracted signals 468A, 468B. The input light ray 465C is at the critical angle and consequently exhibits total internal reflection as noted by the totally internally reflected light signal 466 and the absence of a refracted ray reaching sensor 425C. In the embodiment depicted in FIG. 4D, it is noted that the primary input rays 465A, 465B, 465C and corresponding refracted output rays 468A, 465B, are always parallel (i.e., before accounting for chromatic dispersion and other optical alignment issues).

Figure 4D:
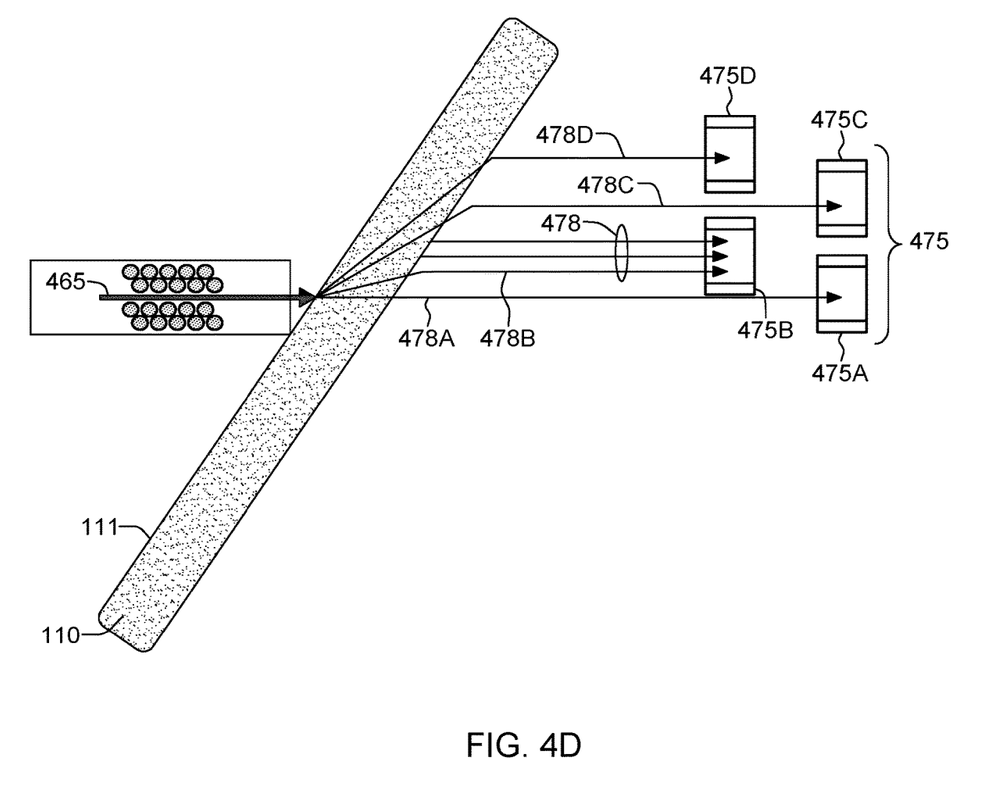

FIG. 4D depicts a further embodiment in which ganged or arrayed photosensors 475 are situated proximate the opposite side of the cavity 110 to cleanly detect light signals refracted through the liquid medium in cavity 110. As the embodiment depicted in FIG. 4D is capable of measuring multiple output angles, this enable material characteristics such as fluid mix concentration based on refractive index (RI).

For example, as shown in FIG. 4D, different rays represent different concentrations that would affect refraction, e.g. a first liquid medium solution at a 50% concentration or mixture of fluids in the cavity can cause a first angle of refraction of injected light 465 within the cavity such that corresponding refracted light 478A is only detected by a first photosensor 475A; likewise, a second liquid medium solution at a 60% concentration or mixture of fluids in the cavity can cause a second angle of refraction of injected light 465 within the cavity such that corresponding refracted light 478B is only detected by a second photosensor 475B; a third liquid medium solution at a 70% concentration or mixture of fluids in the cavity can cause a third angle of refraction of injected light 465 within the cavity such that corresponding refracted light 478C is only detected by a third photosensor 475C; and a fourth liquid medium solution at an 80% concentration or mixture of fluids in the cavity can cause a fourth angle of refraction of injected light 465 within the cavity such that corresponding refracted light 478D is only detected by a fourth photosensor 475D. The exact amount of refraction change is specific to the solution and its components, and can be is mapped via an empirical model of refraction angle to % concentrate or similar measure.

Similarly, detection sensitivity/quantization is based on the number of sensors, and how densely they are spaced. For example, if light ray photosensors 475B, 475D are removed, the quantization steps would be 50% and 70% solution, with no finer detection capable in-between.

The plurality of light rays 478 shown refracted from the input light 465 represent one such difference, e.g. 59%, 60% and 61% liquid mixture concentrations, for example. However, in the embodiment depicted, each of these incrementally refracted rays are all being detected by sensor 475B representing a 60% mixture concentration.

In one embodiment, by orienting detector sensors 425 as an array, the input light at the multiple waveguides may be scanned (e.g., at different wave lengths, or different pulse frequencies) and the resulting photocurrents from detected array 415, 425, can be used to detect different fluid levels 433. In one embodiment, the flow speed of the fluid may be controlled by detecting the respective times the light 468 arrives at the detectors, thus rendering systems of FIG. 4B as a flow rate meter. The accuracy of such a flow rate meter could be enhanced by end-capping the flow of a desired reagent with a neutral liquid with a different refractive index. Fluid flow in microfluidics is highly laminar and turbulent mixing is not likely to occur in such a channel.

In the pumped microfluidics system 400, a minimum quantization is one unit of sensor signals, e.g., a known cavity volume segment providing a sensed signal, that will correspond to a known fluid volume (dependent upon the dimensions of the cavity) is a minimum resolution. Further, a maximum amount of a fluid input in a dispense cycle or a pumping cycle of fluid may corresponding to a total number of sensors used. For example, a receipt of an electrical current generated by a particular photosensor 415 and a particular photosensor 425 at the controller may indicate a predetermined volume of fluid flow within the cavity. A sensor may first detect a reflected input light as a detection of a starting point of the fluid flow within the cavity, and a second sensor may detect a refracted light which may indicate an end of the fluid flow within the cavity and based on the corresponding generated signals 485, 495 received at microcontroller 175, the controller can activate a switch or deactivate the pump, for example.

At the microscale dimensions of the microfluidic system embodiments described herein, injected fluids will not mix as they exhibit a laminar flow without mixing. Thus, in one embodiment, to enable precise amounts of fluid to be dispensed, a series of fluid segments to be measured may be dispensed that are sandwiched between segments of a buffer fluid that refract differently. In this embodiment, certain photosensors 415 will detect buffer fluids and other (different) sensors may detect the target fluids and corresponding signals generated from those different sensors may be received at the microcontroller 175 as a corresponding series of pulses which would be detected to determine a total volume amount.

In another embodiment, pulses could be used is to measure the amount of a given fluid between two end-cap pulses of different-refractive index fluids.

In a further embodiment, the MEMs liquid level sensing may be used as a homogeneity detector between two layered fluids A/B when using a recirculating mixer or other mixing apparatus, homogeneity can be declared (within a margin) when refractive changes are no longer detected (or are detected within a tolerable margin)

In the multilayer scenario shown in FIG. 4, to anticipate interference patterns or wavelength shifts, or to avoid effect of chromatic dispersion, or other types of interference, the microfluidics design is such that such dispersion is minimized or eliminated. For example, a thin film between the cavity and a bulk material substrate, e.g., Si, may be provided to alter a refraction angle or to amplify/de-amplify bends at the interfaces of the materials through which the injected light passes.

In an example usage, quantities measured by the MEMS sensors 415, 425 include the composition of the fluid within the cavity, a height or level of the fluid within the cavity, or a total amount of fluid dispersed within a measured segment of the cavity. For example, a volume of a target fluid to be measured may be buffered between a first volume of a clear buffer fluid, e.g., Saline, and a second volume of the buffer fluid. In such a case, the length of the buffered target fluid segment may be determined so that an injected volume of the target fluid is determinable. In this example, one or more first sensors 415, 425 will detect the passing of the first volume of clear buffer fluid, and one or more second sensor(s) 415, 425 will detect the passing of the target fluid within the cavity to be measured, until one or more first sensors 415, 425 detect the passing of the second volume of clear buffer fluid. Based on the received signal currents 485, 495, the volume of the target solution is determined.

Figure 5:
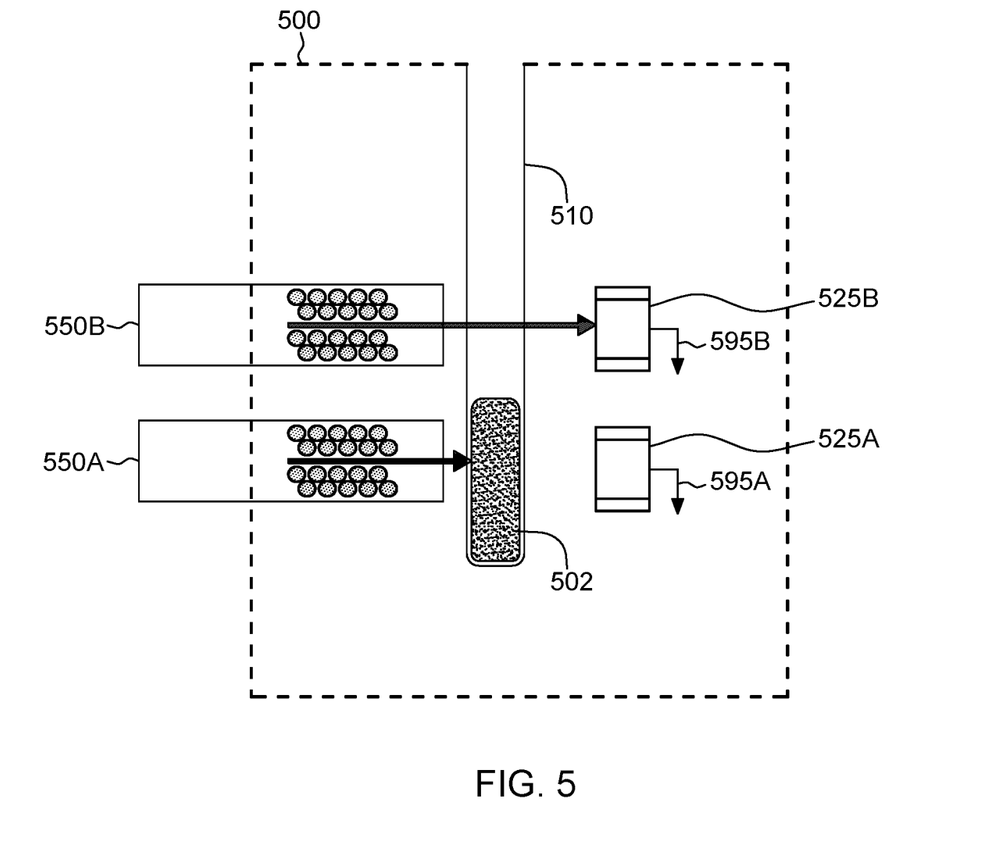
FIG. 5 shows a further embodiment, depicting a MEMS light detection integrated in a microfluidics system where at least two photosensors are provided in an array along one side of a fluid cavity or channel.

FIG. 5 shows a further embodiment, depicting a MEMS light detection integrated in a microfluidics system 500 where at least two photosensors 525A, 525B are provided in an array along one side of a fluid cavity or channel 510. In the embodiment of FIG. 5, two waveguide couplers 550A, 550B are provided to inject light into the cavity 510 designed to be received by respective photosensors 525A, 525B. In an example scenario, light from the first waveguide 550A is not detected by sensor 525A as the fluid 502 in the channel is not transparent. In such a scenario, no current is generated by sensor 525A and no signal detected by the controller. However, at the same time, sensor 525B does detect the light input from waveguide coupler 550B, and current signal 595B is detected. This scenario can be used for liquid on/off testing of the sensors or to test composition of the liquid. Thus, an array of light sensors can detect the blocking of light to the array of sensors 525 (no refraction) through the medium, e.g., 100 percent reflection no refraction.

In an alternate embodiment, the liquid level MEMs optical sensor could also be used in an application to look at absorption of light of a fluid to detect an amount of solute (or particulate) within a solution.

Figures 6A, 6B:
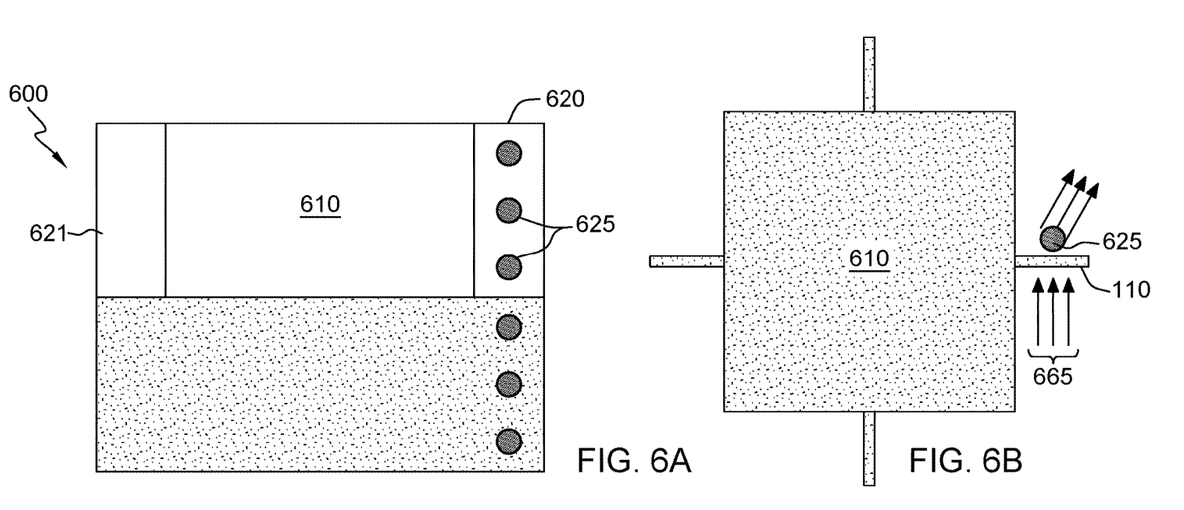
FIG. 6A depicts a plurality of MEMS light detection sensors integrated in a fluid reservoir of a fixed volume includes one or more sensors built into a sidewall of the reservoir.
FIG. 6B is a top down view of the reservoir of FIG. 6A.

In a further embodiment, shown in FIG. 6A, there is depicted a plurality of MEMS light detection sensors integrated in a microfluidics system 600 embodying the features of the present invention. In the side view depicted in FIG. 6A, a fluid reservoir 610 of a fixed volume includes an array of one or more sensors 625 built into a sidewall 620 of the reservoir. FIG. 6B is a top down view of the reservoir 610 of FIG. 6A. As shown in the corresponding top down view of the reservoir 610 of FIG. 6B, a liquid in a conveying channel or cavity 110 feeding fluid into the reservoir 610 is sensed according to the embodiments depicted herein, i.e., light 665 from a light coupling waveguide (not shown) is sensed by MEMS liquid level sensor 625 in the manner as described herein.

Figure 7A:
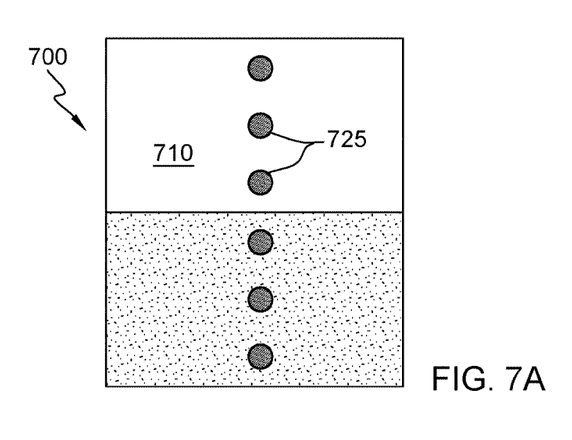
FIG. 7A depicts a plurality of MEMS light detection sensors integrated in a fluid reservoir of a fixed volume includes one or more sensors along a side of the reservoir in a further embodiment.
Figure 7B:
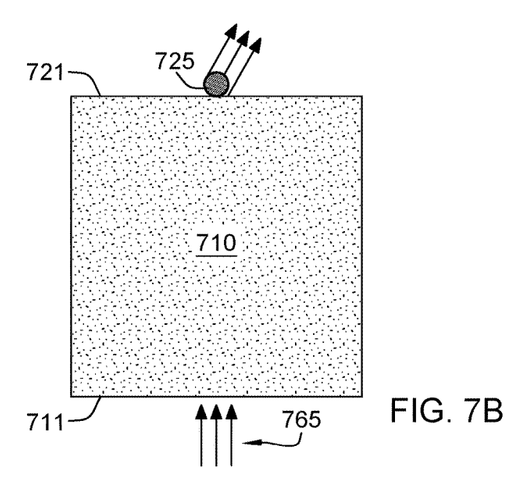
FIG. 7B is a top down view of the reservoir of FIG. 7A.

In a further embodiment, shown in FIG. 7A, there is depicted a plurality of MEMS light detection sensors integrated in a microfluidics system 700 embodying the features of the present invention. In the side view depicted in FIG. 7A, a fluid reservoir 710 of a fixed volume includes an array of one or more sensors 725 built across the reservoir. FIG. 7B is a top down view of the reservoir 710 of FIG. 7A. As shown in the corresponding top down view of the reservoir 710 of FIG. 7B, a liquid level in reservoir 710 is sensed by sensors according to the embodiments depicted herein, where sensors 725 on the side 721 of a reservoir, measure light across the reservoir from side 711 to side 721. Although not shown, it is assumed that corresponding light coupling waveguides are located in opposed relation along an opposite reservoir side 711 to inject light 765 into the reservoir for sensing by sensors 725. In the embodiments of FIGS. 6A, 6B and 7A, 7B, as the fluid within the reservoir rises or falls, the sensors 625, 725 may be able to detect the fluid levels within the reservoir.

In one embodiment, the MEMS liquid level sensors require no moving parts and a microstructure or cavity being sensed are easily cleaned with a solution flushed through. For example, in the embodiments of FIGS. 1-4, multiple pumps 145 could be utilized to flush a measurement channel or cavity 110, e.g., one pump is configured to pump a target solution/medicine and another pump may be configured to pump a neutral or buffer (e.g. saline) solution with the same or different channel.

As mentioned, the microfluidics system embodiments of FIGS. 1-4 could also be used as a flow rate meter to determine volume by measuring the timing of an amount of fluid flow. For example, if a certain amount of material is needed (e.g., medicine into a carrier) the microfluidics system of FIGS. 1-4 can determine the amount of concentrated medicine to include in solution, flow the medicine and carrier fluid into a mixer and determine when refractive index changes from a fluid A to a fluid B which differs at the beginning of the fluid boundary and end of the fluid boundary.

In one embodiment, by detecting the time it takes light to arrive at the detectors, i.e., a time of change (e.g., detecting the end cap buffer fluid and then detecting the regular solution) and the amount of time it takes for this small segment of buffer fluid to propagate across all detectors may be used for dispensed fluid flow rate measurement. In an embodiment, a flow rate of the volume of the fluid being dispensed is readily determined as a function of time it takes to detect light at the sensors, i.e., between the time it takes for a current 185, 485 to be detected and a current 195, 495 to be detected in the embodiment of FIGS. 1-4, e.g., by noting changes in refraction, and using that as a delta time to determine the flow rate between adjacent sensors.

The embodiments described herein with respect to FIGS. 1-6 may be used in conjunction with Tesla valves for fewer moving parts (e.g., rather than check valves). While a check valve can be used to prevent backflow, e.g., a Tesla valve relying on the laminar flow characteristics can be used to prevent a backflow of fluid into the cavity which may impact subsequent measurements.

The present embodiments are contemplated for, but not limited to, use in medical and biometric applications, e.g., such as a reusable lab-on-a-chip used for high volume biochemical screenings with reagents. These can be additionally used for multi-purpose implantable/portable MEMS medical devices (e.g. glucose and blood thinner dispensary), with exact/trickle flow of desired drugs or mixing in situ.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The invention claimed is:

1. A microfluidics system comprising:
an integrated circuit (IC) chip having a cavity structure within a substrate, said cavity structure adapted to receive fluid from a fluid source and convey said fluid to another location on said chip;
a waveguide element for coupling an input light from a light source to a surface boundary of said cavity;
a first sensor integrated within the substrate of said IC chip at a first location relative to one side of said cavity for detecting light reflected internally from the surface boundary at the first location;
a second sensor integrated within the substrate of said IC chip at a second location relative to an opposite side of said cavity for detecting light refracted from said input light when fluid is in the cavity at the second location, said first and second sensors generating a respective first and second electrical signal upon a respective detection of light;
a controller in said circuit chip receiving said respective electrical signal upon detection of said light at said first and second sensor, said controller generating signals for controlling said fluid source to dispense a precise amount of fluid based on received said first and second electrical signals.

2. The microfluidics system of claim 1, wherein said waveguide element injects light at a critical angle relative to the cavity boundary, said first sensor receives light totally internally reflected from a surface boundary of said cavity when fluid level within said cavity is below a level of an interface where the waveguide element inputs said light at said cavity boundary.

3. The microfluidics system of claim 2, wherein said first sensor location and second sensor location are at a determined respective first distance and second distance relative to said interface level at said cavity as a function of a type of an index of refraction of said fluid being dispensed in said cavity.

4. The microfluidics system of claim 1, wherein said first sensor receives a first amount of light reflected at the boundary of said cavity at said first location and said second sensor senses a second amount of light refracted through said cavity when fluid level within said cavity is at the interface level, wherein a known volume of fluid in said cavity is detected when said second sensor senses the second amount of light.

5. The microfluidics system of claim 1, further comprising:
an array of additional light coupling waveguide elements further oriented in alignment relative to the waveguide element at locations along said one side of said cavity boundary, each said additional light coupling waveguide elements inputting a same or different light; and
an array of additional second sensors located on said opposite side of said cavity in an alignment relative to light input levels of each said additional coupling waveguide elements, each said second sensor receiving light refracted within the cavity from a different additional coupling waveguide element and generating a respective additional electrical signals upon detection of light refracted from a waveguide based on a level of fluid in said cavity.

6. The microfluidics system of claim 5, further comprising:
a microfluidics pump system adapted to dispense multiple fluid types within the cavity, wherein a first sensor of said array of second sensors is located for detecting refracted light through a first type of liquid being pumped in the cavity with a first index of refraction, and a second sensor of said array of second sensors is located in spaced apart relation from the first sensor for detecting refracted light through a second type of liquid with a second index of refraction being pumped in the cavity.

7. The microfluidics system of claim 6, wherein said controller receives said additional detected signals and generates controls for said pumping system to activate or deactivate pumping of fluid within said cavity to control dispensing of a precise amount of fluid based on particular electrical signals received from predetermined additional second sensors upon receiving a refracted light.

8. The microfluidics system of claim 5, wherein said second sensors of said array are located in spaced apart relation with respect to each other to detect measuring of input light refracted at multiple refractive angles, said controller receiving signals generated by said second sensors upon detecting of light at said multiple angles to determine a fluid mix concentration based on refractive index (RI) of the fluid.

9. The microfluidics system of claim 5, further configured as a flow rate meter, wherein a timing of said signals generated by said second sensors and received at said controller are used to determine a flow rate of fluid dispensed within said cavity.

10. A method of operating a microfluidics system in an integrated circuit (IC) chip having a cavity structure within a substrate, said cavity structure adapted to receive fluid from a fluid source and convey said fluid to another location on said chip, said method comprising:
coupling, using a waveguide element, an input light from a light source to a surface boundary of said cavity for injecting light into said cavity;
detecting, using a first sensor integrated within the substrate of said IC chip, a light at a first location relative to one side of said cavity, said light reflected internally from the surface boundary of said cavity;
detecting, using a second sensor integrated within the substrate of said IC chip, light at a second location relative to an opposite side of said cavity, said light refracted from said input light when fluid is in the cavity, said first and second sensors generating a respective first and second electrical signal upon a respective detection of light;
receiving, at a controller in said circuit chip, said respective first and second electrical signals upon detection of said light both said first and second sensors, and
generating, at said controller, signals for controlling said fluid source to dispense a precise amount of fluid based on received said first and second electrical signals.

11. The method of claim 10, further comprising:
injecting, by said waveguide element, light at a critical angle relative to the cavity boundary, said first sensor receiving light totally internally reflected from a surface boundary of said cavity when fluid level within said cavity is below a level of an interface where the waveguide element inputs said light at said cavity boundary.

12. The method of claim 10, further comprising:
receiving, at said first sensor, a first amount of light reflected at the boundary of said cavity at said first location; and
receiving, at said second sensor, a second amount of light refracted through said cavity when fluid level within said cavity is at the interface level where light is injected into said cavity at a cavity boundary, wherein a known volume of fluid in said cavity is detected when said second sensor senses the second amount of light.

13. The method of claim 10, wherein the microfluidics system further comprises an array of additional light coupling waveguide elements further oriented in alignment relative to the waveguide element at locations along said one side of said cavity boundary, and an array of additional second sensors located on said opposite side of said cavity in an alignment relative to a level within the cavity at which light is injected by each said additional coupling waveguide element, said method further comprising:
inputting, using each said additional light coupling waveguide element, a light at a same or different light at a respective cavity boundary interface; and
receiving, by one or more said second sensors, light refracted within the cavity from a different additional coupling waveguide element, each said one or more second sensors generating a respective additional electrical signal upon detection of light refracted from a waveguide based on a level of fluid in said cavity.

14. The method of claim 13, wherein said microfluidics system further comprises a microfluidic pumping system adapted to dispense multiple fluid types within the cavity, said method further comprising:
detecting, by a first second sensor of said array of second sensors refracted light through a first type of liquid being pumped in the cavity with a first index of refraction, and
detecting, by a second sensor located in spaced apart relation from the first sensor of said array of second sensors, refracted light through a second type of liquid with a second index of refraction being pumped in the cavity.

15. The method of claim 14, further comprising:
receiving, at said controller, said additional detected signals; and
generating control signals for said pumping system to activate or deactivate pumping of fluid within said cavity to control dispensing of a precise amount of fluid based on particular electrical signals received from predetermined additional second sensors upon receiving a refracted light.

* * * * *